United States Patent [19]

Haese et al.

[11] Patent Number: 4,909,594
[45] Date of Patent: Mar. 20, 1990

[54] OPTICAL COUPLER PRESSURE OR LOAD SENSOR

[75] Inventors: Nathan N. Haese, Walnut Creek; David R. Pedersen, Clayton, both of Calif.

[73] Assignee: The Dow Chemical Company, Midland, Mich.

[21] Appl. No.: 314,686

[22] Filed: Feb. 23, 1989

[51] Int. Cl.⁴ ................................................. G02B 6/02
[52] U.S. Cl. .............................. 350/96.29; 350/96.15
[58] Field of Search ............ 250/227; 350/96.1, 96.15, 350/96.29, 96.3, 96.32, 96.33, 96.34

[56] References Cited

U.S. PATENT DOCUMENTS

| | | | |
|---|---|---|---|
| 4,552,431 | 9/1983 | Allemand et al. | 350/96.34 |
| 4,668,861 | 5/1987 | White | 250/227 |
| 4,703,757 | 11/1987 | Cohen | 128/667 |
| 4,708,833 | 11/1987 | Ohsawa et al. | 264/1.5 |
| 4,712,004 | 12/1987 | Spillman, Jr. | 250/227 |
| 4,743,629 | 5/1988 | Karakelle et al. | 521/175 |
| 4,830,461 | 5/1989 | Ishiharada et al. | 350/96.29 |
| 4,840,452 | 6/1989 | Federmann et al. | 350/96.23 |

OTHER PUBLICATIONS

"Fiber Optics," *Kirk–Othmer: Encyclopedia of Chemical Technology*, 3rd edition, vol. 10, John Wiley & Sons, New York, 1980, pp. 125–147.
"Fibers, Optical," *Encyclopedia of Polymer Science and Engineering*, vol. 7, John Wiley & Sons, New York, 1986, pp. 1–15.
"Silicones," *Kirk–Othmer: Encyclopedia of Chemical Technology*, 3rd edition, vol. 20, John Wiley & Sons, New York, 1982, pp. 922–962.
"Urethane Polymers," *Kirk–Othmer: Encyclopedia of Chemical Technology*, 3rd edition, vol. 23, John Wiley & Sons, New York, 1983, pp. 576–607.
Grochowski et al., "Improving Measurement Acuracies in Cross-Talk Optical Sensors," *Rev. Sci. Instrum.*, 57(12) Dec. 1986, pp. 2987–2991.

*Primary Examiner*—William L. Sikes
*Assistant Examiner*—John Ngo

[57] ABSTRACT

The invention is a durable, zero-based optical coupler pressure/load sensor which is immune from electromagnetic interference.

16 Claims, 3 Drawing Sheets

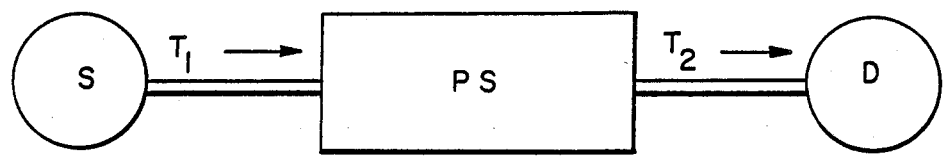
FIG._1.
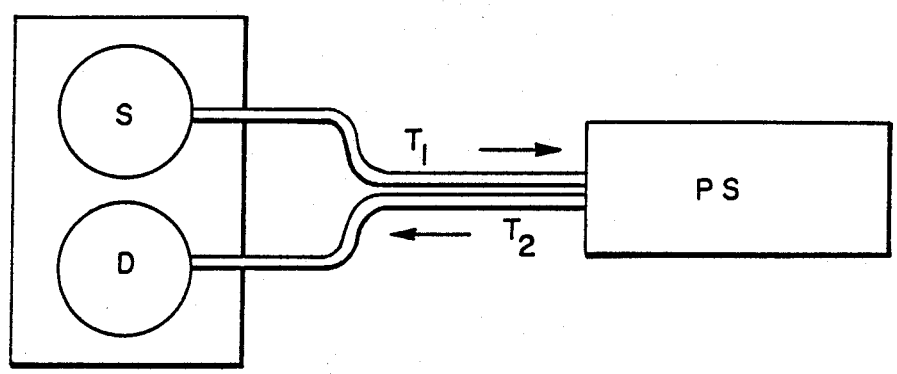
FIG._2.
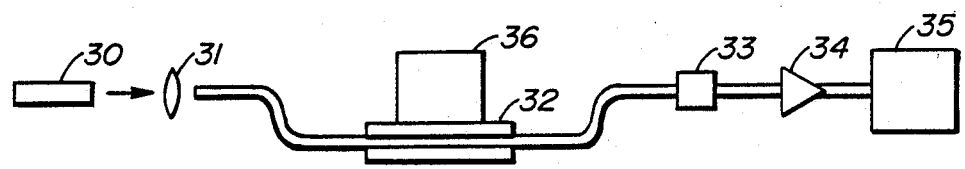
FIG._3.

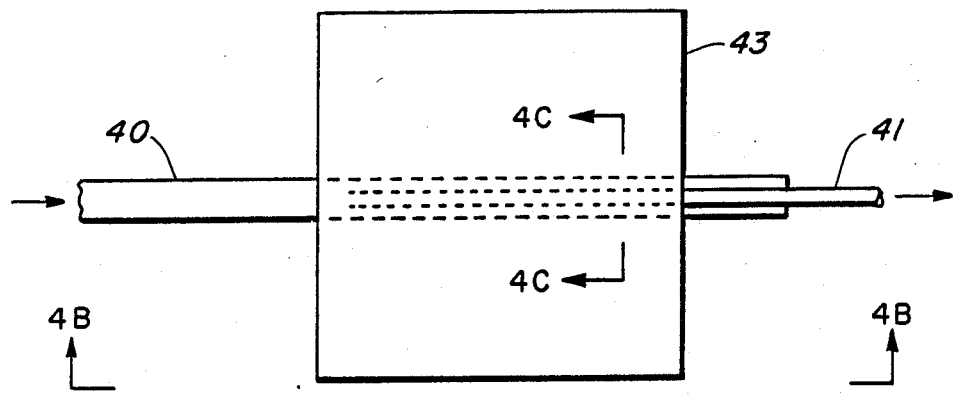
FIG._4A.
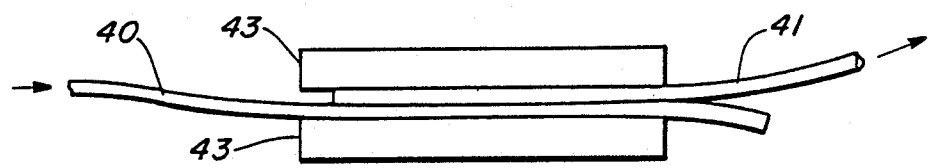
FIG._4B.
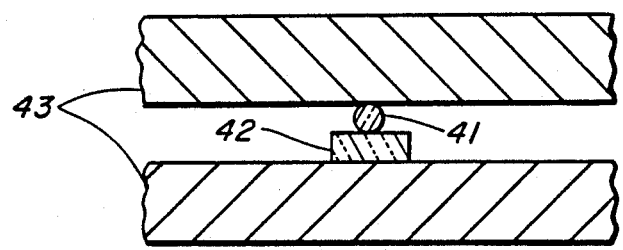
FIG._4C.

OPTICAL COUPLER PRESSURE OR LOAD SENSOR

BACKGROUND OF THE INVENTION

This invention relates to a novel pressure/load sensing device. In particular, this invention relates to a pressure/load sensing device utilizing a polymer optical coupler comprised of a flexible thermoplastic aliphatic segmented polyurethane waveguide and a second optical waveguide.

Conventional electronic pressure/load sensors suffer from electromagnetic pickup interference. The use of optical waveguide based pressure/load sensors eliminates the problem of electromagnetic interference. However, present optical waveguides are primarily fabricated from glass or hard glassy polymers such as acrylics and styrenics. Such optical waveguides possess low flexibility and low strength. Such polymer optical waveguides also sometimes possess low use temperatures. These limitations of the present optical waveguides result in optical waveguide based pressure/load sensors which are easily damaged.

What is needed is a durable pressure/load sensor which is immune to electromagnetic interference. The pressure/load sensor should also possess a zero-based signal.

SUMMARY OF THE INVENTION

The invention is an optical coupler pressure/load sensor comprising:

A. a light source capable of transmitting light through the optical waveguides;

B. a means of transmitting light from the light source to a pressure/load sensing component;

C. a pressure/load sensing component comprising:
  (i) a first optical waveguide comprising an unclad flexible thermoplastic aliphatic segmented polyurethane core through which light from the light source is transmitted,
  (ii) a second optical waveguide longitudinally aligned with the first optical waveguide comprising a harder optically transmitting material than the flexible aliphatic polyurethane material of the first optical waveguide, and
  (iii) a compressive means such that when the two optical waveguides are compressed under pressure/load, light from the first optical waveguide is transmitted into and through the second optical waveguide without deleteriously affecting the physical integrity of the optical waveguides;

D. a means of transmitting light from the pressure/load sensing component to a light detector:

E. a light detector capable of measuring the intensity of light transmitted through the second optical waveguide: and F. optionally an informational handling system capable of recording the light intensity signal received from the light detector.

In an alternate embodiment, the invention is an optical coupler pressure/load sensor comprising:

A. a light source capable of transmitting light through the optical waveguides:

B. a means of transmitting light from the light source to a pressure/load sensing component:

C. a pressure/load sensing component comprising:
  (i) a first optical waveguide comprising a harder optically transmitting material than the flexible aliphatic segmented polyurethane material of the second optical waveguide through which light from the light source is transmitted,
  (ii) a second optical waveguide longitudinally aligned with the first optical waveguide comprising an unclad flexible thermoplastic aliphatic segmented polyurethane core, and
  (iii) a compressive means such that when the two optical waveguides are compressed under pressure/load, light from the first optical waveguide is transmitted into and through the second optical waveguide without deleteriously affecting the physical integrity of the optical waveguides:

D. a means of transmitting light from the pressure/load sensing component to a light detector:

E. a light detector capable of measuring the intensity of light transmitted through the second optical waveguide: and F. optionally an informational handling system capable of recording the light intensity signal received from the light detector.

The pressure/load sensor of this invention is durable. The pressure/load sensor is immune from electromagnetic interference and possesses a zero-based signal.

BRIEF DESCRIPTION OF THE DRAWINGS

FIGS. 1 and 2 are schematic representations of the pressure/load sensor of this invention.

FIG. 3 illustrates the experimental layout of the pressure/load sensor described in Example 1.

FIG. 4a, 4b and 4c illustrates the deployment of the optical waveguides of Example 1 between two parallel plates.

DETAILED DESCRIPTION OF THE INVENTION

Figure 5:
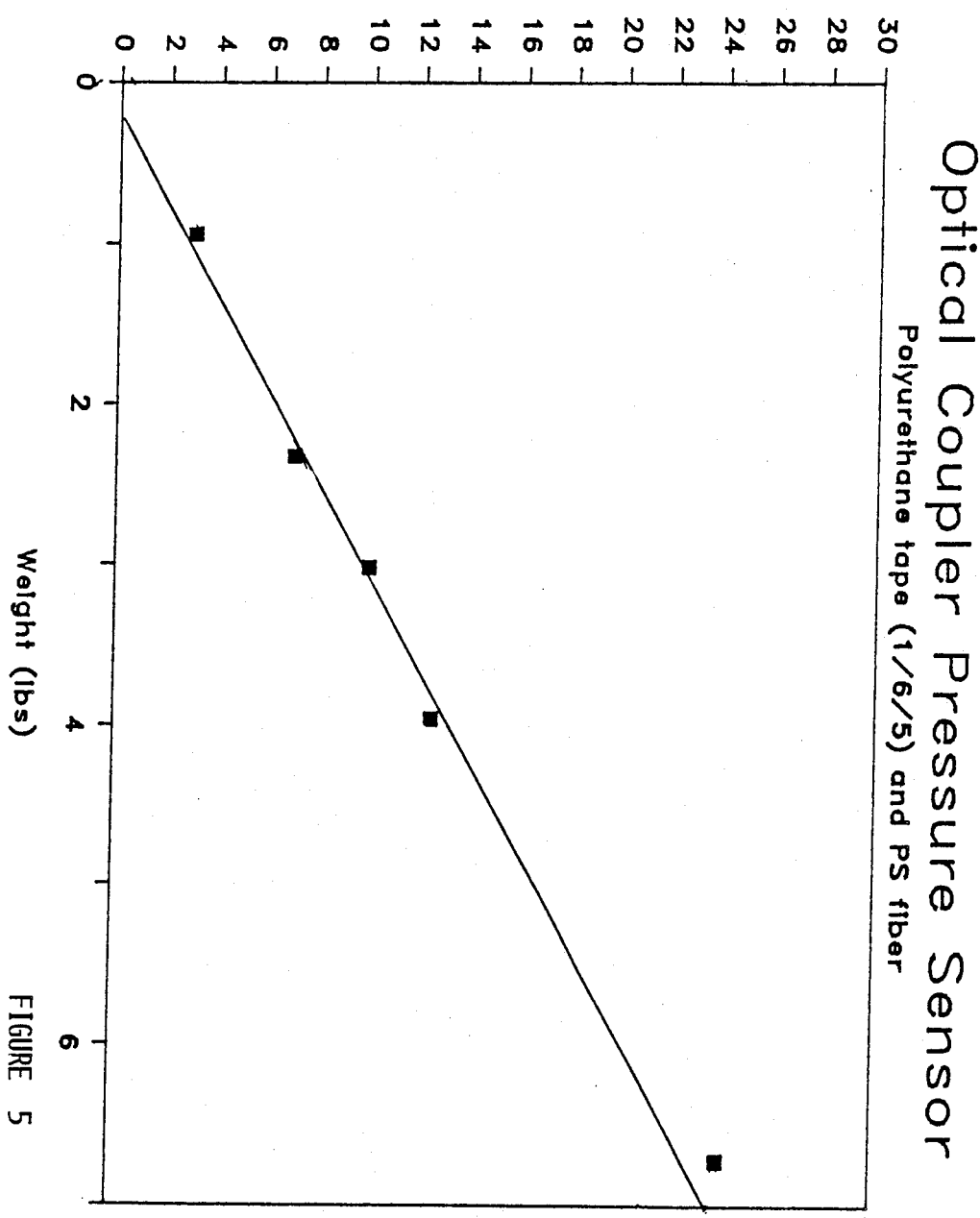
FIG. 5 records the data obtained from the pressure/load sensor described in Example 1.

FIGS. 1 and 2 are schematic representations of the pressure/load sensor of this invention. S represents the light source. D represents the light detector and optional informational handling system. $T_1$ represents the means of transmitting light from the light source to the pressure/load sensing component PS. $T_2$ represents the means of transmitting light from the pressure/load sensing component PS to the light detector and optional informational handling system D. The pressure/load sensing component PS comprises the optical waveguides and a compressive means.

The light source may be any source capable of transmitting light through the first optical waveguide over wavelengths of about 400 to about 900 nanometers. The light source may be monochromatic or polychromatic. For example, the light source may be a visible region tungsten bulb, a light emitting diode, a gaseous laser, or other light source. See Kist, "Sources and Detectors for Fiber-Optic Systems," *Optical Fiber Sensors.* Martinus Nijhoff Publishers, 1987, pp. 267-298, incorporated herein by reference. The light from the light source may optionally be passed through a focussing means before being transmitted through the first optical waveguide.

The means of transmitting light from the light source to the pressure/load sensing component is preferably an optical waveguide with an attenuation of less than about 20 decibels/meter. Such optical waveguides may be made of glass or polymers. Such an optical waveguide preferably comprises the first optical waveguide in the pressure/load sensing component.

The pressure/load sensing component preferably comprises a first optical waveguide comprising an unclad flexible thermoplastic aliphatic segmented polyurethane core through which light from the light source is transmitted, a second optical waveguide longitudinally aligned with the first optical waveguide comprising an optically transmitting material harder than the flexible thermoplastic aliphatic polyurethane material of the first optical waveguide, and a compressive means such that when the two optical waveguides are compressed under pressure, light from the first optical waveguide is transmitted into and through the second optical waveguide without deleteriously affecting the physical integrity of the optical waveguides. In an alternate embodiment, the pressure/load sensing component comprises a first optical waveguide comprising an optically transmitting material harder than the flexible aliphatic segmented polyurethane material of the second optical waveguide, through which light from the light source is transmitted, a second optical waveguide longitudinally aligned with the first optical waveguide comprising an unclad flexible thermoplastic aliphatic segmented polyurethane core, and the compressive means.

The first optical waveguide is preferably comprised of an unclad flexible thermoplastic aliphatic segmented polyurethane core. Polyurethanes preferred for use in this invention are formed by the reaction of a glycol, a diisocyanate, and a chain extender as described in Collins, U.S. Pat. No. 4,621,113, incorporated herein by reference. Such polyurethanes preferably comprise alternating soft and hard segments, (1) said soft segments being derivable from the reaction of
  (a) generally linear molecules terminated at each end by an isocyanate group and consisting of
    (i) n residues of one or more methylolterminated polyetherglycols having molecular weights of from about 1000 to about 6000 and consisting essentially of chains of $-O-CRR^1-CH^2-$ units in which each of R and $R^1$ is hydrogen, methyl, or ethyl independently, except that in at least a preponderance of said units one or the other of R and $R^1$ is not hydrogen, and
    (ii)(n+1) residues of one or more nonaromatic diisocyanates, joined to said polyetherglycol residues by intervening carbamate groups,
    n ranging from 1 to about 4 and having an average value of from about 1.5 to about 1, and
(2) said hard segments being derivable from the reaction of a chain extender with the isocyanate end groups in said molecules and with one or more nonaromatic non-polymeric diisocyanates of a nature such that the resulting carbamate groups will be unable to associate with each other in such a manner as to result in domain crystallinity in the resulting polymer.

Preferred glycols used to form the polyurethanes useful in this invention are predominantly derivable from branched $C_{3-6}$ alkylene oxides, more preferably propylene oxide and/or butylene oxide. Some ethylene oxide derivable units may be included, so long as the essential effect of branched units on the character of the pre- and final polymers is retained and phase crystallization does not occur. The amount of ethylene oxide units to branched alkylene oxide units is preferably less than about 20 weight percent. Glycols especially preferred for use in this invention include poly(oxypropyleneoxyethylene)glycol, for example, VORANOL® 5287 diol (trademark of The Dow Chemical Company), and poly(oxybutyleneoxyethylene)glycol.

Preferably the diisocyanates useful in this invention comprise no aromatic moieties and comprise only aliphatic and/or cycloaliphatic moieties Preferred diisocyanates include polymethylene diisocyanates, 1,4-bis-(isocyanatomethyl)cyclohexane, cyclohexane-1,4-diisocyanate, 2,2,4-trimethylhexamethylene diisocyanate, di(isocyanatoethyl)carbonate, lysine diisocyanate, isophorone diisocyanate, 1,8-diisocyanato-p-methane, 1,6-diisocyanato-2,2,4,4-tetramethylhexane, 1,6-diisocyanato-2,4,4 trimethylhexane, menthylene bis(4-cyclohexyl isocyanate), isopropylidene bis(4-isocyanatocyclohexane), 1,4-dimethylene isocyanatocyclohexane, and 1,3-dimethylene isocyanatocyclohexane.

Preferred chain extenders include aliphatic $C_{2-4}$ straight chain and branched chain diols, diamines, and hydroxyamines: hydrazine and piperazine: cyclo- and dicycloaliphatic diols, diamines, or hydroxyamines having up to 12 carbon atoms, hydroquinone and resorcinol—as such or as the bis(2-hydroxyethyl)ethers, and aromatic and heterogeneous nuclei - as such or hydrogenated, and substituted with two groups which are methylol and/or aminomethyl. More preferred are $C_{2-4}$ diols.

The mole ratio of glycol: diisocyanate: chain extender is preferably in the range from about 1:3:2 to about 1:15:14, more preferably from about 1:4:3 to about 1:6:5. The weight-average molecular weight of said polyurethanes is preferably in the range of about 100,000 to about 200,000. The polyurethanes useful in this invention preferably possess a Shore hardness as measured by ASTM D2240-86 of between about A45 and about D80. The refractive index of said polyurethanes is preferably between about 1.45 and about 1.55.

The first optical waveguide may be any shape capable of transmitting light into the second optical waveguide upon compression. The cross-section of such an optical waveguide may be round, oval, square, rectangular, triangular, etc. The first optical waveguide is preferably in the form of a ribbon or tape. The width of such ribbon or tape should be sufficient to provide adequate surface area contact with the second optical waveguide upon compression. Such a ribbon or tape preferably possesses a width of between about 0.075 and about 5 centimeters. The thickness of such a ribbon or tape is preferably between about 0.2 and about 2 millimeters.

The second optical waveguide may be any optical waveguide capable of coupling light from the first optical waveguide when the two optical waveguides are compressed. The hardness of such an optical waveguide should be greater than that of the flexible aliphatic segmented polyurethane material used in the first optical waveguide. Such optical waveguides may be comprised of glass or polymers: preferably such optical waveguides are comprised of polymers and possess an attenuation of less than about 20 decibels/meter. Preferred polymers for the second optical waveguide include polystyrene, polymethyl methacrylate, aromatic polyestercarbonate, polycarbonate, styrene/α-methyl styrene copolymer, styrene/methyl methacrylate copolymer, styrene/methyl acrylate copolymer, methyl methacrylate/ethyl acrylate copolymer, and styrene/vinyl toluene copolymer.

The second optical waveguide may be any shape capable of coupling light from the first optical waveguide upon compression. The cross-section of such an optical waveguide may be round, oval, square, rectangular, triangular, etc. The second optical waveguide is preferably in the form of a fiber. Such a fiber preferably possesses a diameter of between about 0.1 and about 2.0 millimeters.

In an alternate embodiment, the preferred materials used for the first and second optical waveguides may be interchanged.

The polymer optical waveguides useful in this invention may be made by methods known in the art. One process involves forming the core and clad in a preform which is thereafter heated to a temperature at which the core and clad may be drawn down to an appropriate size for the polymer optical waveguide. In another process, the core is extruded and then the clad may be coated on the core and thereafter cured in place. The use of cup-coating techniques may generally be used and any curing mechanism which adequately cures the clad to the core is suitable, for example, heat cure or ultraviolet (UV) cure. In still another process, the optical waveguides may be formed by a co-extrusion process in which the core and clad are simultaneously extruded to form the desired shape. In the co-extrusion process, the core material and the clad material are separately heated to a temperature suitable for extrusion and the materials are thereafter extruded. The core and clad material are brought together in a die. The extrusion temperature is dependent upon the particular core and clad materials and the temperature used must be suitable for both materials. During co-extrusion, it is important to match the viscosity of the materials, such that under conditions of temperature and shear the viscosity of the clad is equal to or less than the viscosity of the core.

The maximum use temperature of said optical waveguides is preferably at least about 60° C., more preferably at least about 80° C. The attenuation, i.e. light loss, of the waveguides over the range of about 400 to about 900 nanometers is preferably less than about 30 decibels/meter, more preferably less than about 25 decibels/meter.

The first optical waveguide and the second optical waveguide are preferably longitudinally aligned so as to maximize the transmission of light from the first optical waveguide into and through the second optical waveguide when the two optical waveguides are compressed under pressure.

The optical waveguides are placed between compressive means such that when the waveguides are compressed under pressure/load, light from the first optical waveguide is transmitted into and through the second optical waveguide without deleteriously affecting the physical integrity of the waveguides. The transmission of light between the two waveguides is termed coupling or cross-talk. The compressive means preferably comprises a surface or surfaces surrounding the optical waveguides which are harder than the optical waveguides. An example of suitable compressive means includes two parallel metal, plastic, or glass plates. The pressure/load sensor of this invention is zero-based. This means that when there is no pressure/load, that is, no compression, the light detector detects little or no light being transmitted from the pressure/load sensing component through the second waveguide, and increasing pressure/load leads to increasing signal.

The means of transmitting light from the pressure/load sensing component to the light detector is preferably an optical waveguide with an attenuation of less than about 20 decibels/meter. Such optical waveguides may be made of glass or polymers. Such optical waveguides preferably comprise the second optical waveguide in the pressure/load sensing component.

The light transmitted through the second optical waveguide is measured by a light detector. Any detector capable of measuring the transmitted light is suitable. See Kist, "Sources and Detectors for Fiber-Optic Systems," *Optical Fiber Sensors*, Martinus Nijhoff Publishers, 1987, pp. 267-298, incorporated herein by reference. An example of a preferred detector is a silicon PIN detector with transimpedance amplifier or other semi-conducting diode detector or a photomultiplier tube. A suitable output device, such as a voltmeter, oscilloscope, strip chart recorder, or computer may be attached to the light detector to serve as an information handling system to record the light intensity signal received from the light detector.

The pressure or load range of the pressure/load sensor of this invention depends upon the geometry and dimensions of the first and second optical waveguides. Smaller pressures or loads may be sensed by using a softer, more compressible first optical waveguide and larger pressures or loads may be sensed by using a harder, less compressible first optical waveguide. The pressure/load range may be extended by increasing the contact area between the two optical waveguides. The pressures/loads which the pressure/load sensor is capable of measuring depend upon the waveguide geometries and the pressure/load per unit length of waveguides. The optical waveguide pressure/load sensor is preferably capable of measuring pressures/loads of up to about 0.5 pounds/inch of waveguide length. The pressure/load sensor is calibrated for a particular use temperature.

SPECIFIC EMBODIMENTS

The following example is for illustrative purposes only and is not intended to limit the scope of the invention or claims.

EXAMPLE 1

Diagrams of the experimental layout used in this Example are shown in FIGS. 3 and 4. A 5 milliwatt HeNe laser is used as the light source (30). A 10×microscope objective (31) focuses light from the laser on the pressure/load sensing component (32) which consists of a ¼ inch wide, 0.4 millimeter thick ribbon (40) extruded from a polyurethane comprising a mole ratio of 1 mole VORANOL ® 5287 diol, 6 moles hydrogenated methylene diisocyanate, and 5 moles 1,4-butane diol. The polyurethane ribbon and a 0.75 millimeter diameter optical fiber (41) comprised of a polystyrene core and a polymethylmethacrylate clad are longitudinally aligned between two parallel plates (43) in the pressure/load sensing component. A silicon PIN detector (33) with transimpedance amplifier (34) and strip chart recorder (35) measure the intensity of light passing through the optical fiber.

Various weights (36) are used to compress the plates and the intensity of light transferred from the polyurethane ribbon to the polystyrene/polymethylmethacrylate fiber is measured. Data are shown in FIG. 5.

What is claimed is:

1. An optical coupler pressure or load sensor comprising:
   (A) a light source capable of transmitting light through optical waveguides;
   (B) a pressure or load sensing component comprising:
      (i) a first optical waveguide comprising an unclad flexible thermoplastic aliphatic segmented polyurethane through which light from the light source is transmitted,
      (ii) a second optical waveguide longitudinally aligned with the first optical waveguide comprising an optically transmitting material harder than the flexible aliphatic polyurethane of the first optical waveguide,
      (iii) a compressive means such that when the two optical waveguides are compressed under pressure or load, light from the first optical waveguide is transmitted into and through the second optical waveguide without deleteriously affecting the physical integrity of the optical waveguides;
   (C) a means of transmitting light from the light source to the pressure or load sensing component;
   (D) a light detector capable of measuring the intensity of light transmitted through the second optical waveguide; and
   (E) a means of transmitting light from the pressure or load sensing component to the light detector.

2. An optical coupler pressure or load sensor comprising:
   (A) a light source capable of transmitting light through optical waveguides;
   (B) a pressure or load sensing component comprising:
      (i) a first optical waveguide comprising an optically transmitting material through which light from the light source is transmitted,
      (ii) a second optical waveguide longitudinally aligned with the first optical waveguide comprising an unclad flexible thermoplastic aliphatic segmented core, which is less than the optically transmitting material of the first optical waveguide, and
      (iii) a compressive means such that when the two optical waveguides are compressed under pressure or load, light from the first optical waveguide is transmitted into and through the second optical waveguide without deleteriously affecting the physical integrity of the optical waveguides;
   (C) a means of transmitting light from the light source to the pressure or load sensing component;
   (D) a light detector capable of measuring the intensity of light transmitted through the second optical waveguide; and
   (E) a means of transmitting light from the pressure or load sensing component to the light detector.

3. The pressure or load sensor of claim 1 or 2 which further comprises a means for focussing the light from the light source into the means for transmitting light from the light source to the pressure/load sensing component.

4. The pressure or load sensor of claim 3 wherein the means for transmitting light from the light source to the pressure/load sensing component comprises the first optical waveguide.

5. The pressure or load sensor of claim 4 wherein the means for transmitting light from the pressure/load sensing component to the light detector comprises the second optical waveguide.

6. The pressure or load sensor of claim 5 which further comprises
   (F) an informational handling system capable of recording the light intensity signal received from the light detector.

7. The pressure or load sensor of claim 6 wherein the informational handling system is comprised of a voltmeter, oscilloscope, strip chart recorder, or computer.

8. The pressure or load sensor of claim 6 wherein the first optical waveguide comprises a ribbon.

9. The pressure or load sensor of claim 8 wherein the ribbon is between about 0.075 and about 5 centimeters wide and between about 0.2 and about 2 millimeters thick.

10. The pressure or load sensor of claim 6 wherein the second optical waveguide comprises a fiber.

11. The pressure or load sensor of claim 10 wherein the fiber has a diameter of between about 0.1 and about 2.0 millimeters.

12. The pressure or load sensor of claim 10 wherein the compressive means comprises two parallel plates.

13. The pressure or load sensor of claim 11 wherein the unclad flexible thermoplastic aliphatic segmented polyurethane optical waveguide comprises alternating soft and hard segments,
   (1) said soft segments being derivable from the reaction of
      (a) generally linear molecules terminated at each end by an isocyanate group and consisting of
         (i) n residues of one or more methylolterminated polyetherglycols having molecular weights of from about 1000 to about 6000 and consisting essentially of chains of —O—CRR$^1$—CH$^2$— units in which each of R and R$^1$ is hydrogen, methyl, or ethyl independently, except that in at least a preponderance of said units one or the other of R and R$^1$ is not hydrogen, and
         (ii) (n+1) residues of one or more nonaromatic diisocyanates, joined to said polyetherglycol residues by intervening carbamate groups,
         n ranging from 1 to about 4 and having an average value of from about 1 to about 1.5, and
   (2) said hard segments being derivable from the reaction of a chain extender with the isocyanate end groups in said molecules and with one or more nonaromatic non-polymeric diisocyanates of a nature such that the resulting carbamate groups will be unable to associate with each other in such a manner as to result in domain crystallinity in the resulting polymer.

14. The pressure/load sensor of claim 13 wherein the polyurethane optical waveguide possesses a Shore hardness value in the range of from about A45 to about D80 as measured by ASTM D2240-86.

15. The pressure/load sensor of claim 14 wherein the first and second optical waveguides have an attenuation over a wavelength range of about 400 to 90 nanometers of about 30 decibels/meter or less.

16. The pressure/load sensor of claim 15 wherein the pressure/load sensor is capable of measuring pressures/loads of up to about 0.5 pounds/inch of waveguide length.

* * * * *